(No Model.)

J. E. H. HYDE.
MECHANISM FOR OPERATING CAR COUPLINGS.

No. 566,398. Patented Aug. 25, 1896.

WITNESSES:

INVENTOR
J. E. Hindon Hyde

THE NORRIS PETERS CO., PHOTO-LITHO., WASHINGTON, D. C.

UNITED STATES PATENT OFFICE.

JOHN E. HINDON HYDE, OF NEW YORK, N. Y.

MECHANISM FOR OPERATING CAR-COUPLINGS.

SPECIFICATION forming part of Letters Patent No. 566,398, dated August 25, 1896.

Application filed December 18, 1895. Serial No. 572,511. (No model.)

*To all whom it may concern:*

Be it known that I, JOHN EDMUND HINDON HYDE, a citizen of the United States, residing at New York city, in the county and State of New York, have invented certain new and useful Improvements in Mechanism for Operating Car-Couplings, of which the following is a full, true, and accurate description, reference being had to the accompanying drawings, illustrating my invention.

The object of my invention is to use electricity to operate a car-coupling, and thereby lessen the labor which is now done by hand solely, and to enable the workman or operator to operate the coupling on each car separately, and independent of the fact whether or not such car is connected to another car or vehicle, or to the engine or locomotive.

In the two forms of my invention which I have illustrated, and which are intended for electric railways having a stationary source of electric current, an electric motor is carried by each car or vehicle, but derives its current from a branch circuit in electrical connection with the main-line conductors through traveling connections carried by said car. This branch circuit, therefore, is not broken by the mere act of uncoupling the car or vehicle from another car or vehicle, or from the locomotive, but forms a separate independent branch circuit for each car, which can be made or broken at the will of the operator by a switch located at some convenient point in said branch circuit. The branch circuit may be connected to the main-line conductors by means of a trolley mounted upon the car, or by the car-wheels, or by any suitable means adapted to the form of construction of the main-line conductors; and of course this separate and independent branch circuit on each car or vehicle in which a coupling-operating motor is included may be a branch from another branch circuit of the same independent character, used, for instance, in lighting or heating the car or vehicle; but, with all variations in particular modes of construction, the coupler-motor should be, in its best form, as before stated, in a branch circuit which is independent of any other circuit whatever, in that it can be made and broken at will by the operator without making or breaking any other circuit used for operating other devices, such as lamps, heaters, &c., carried by the car.

Figure 1:
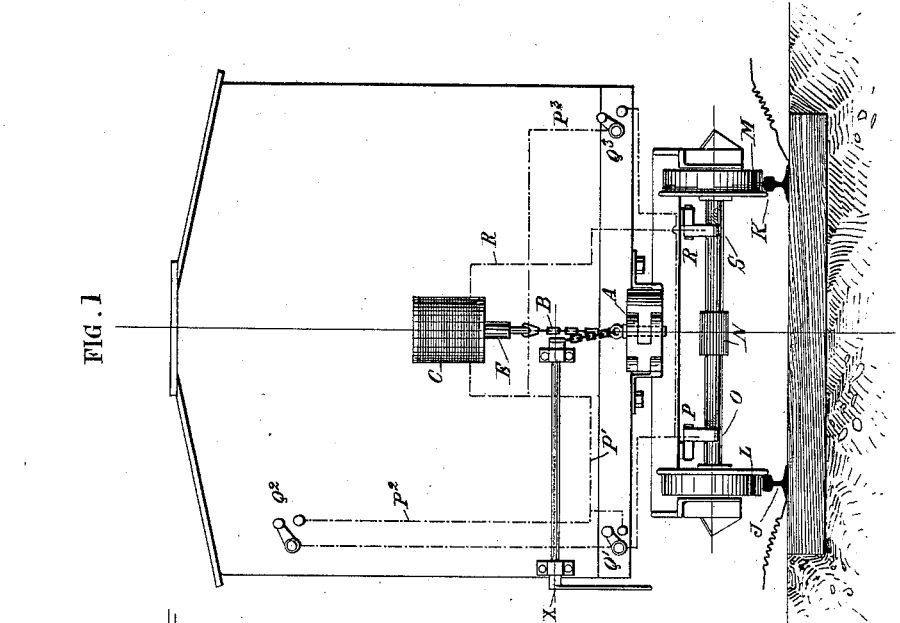
Figure 2:
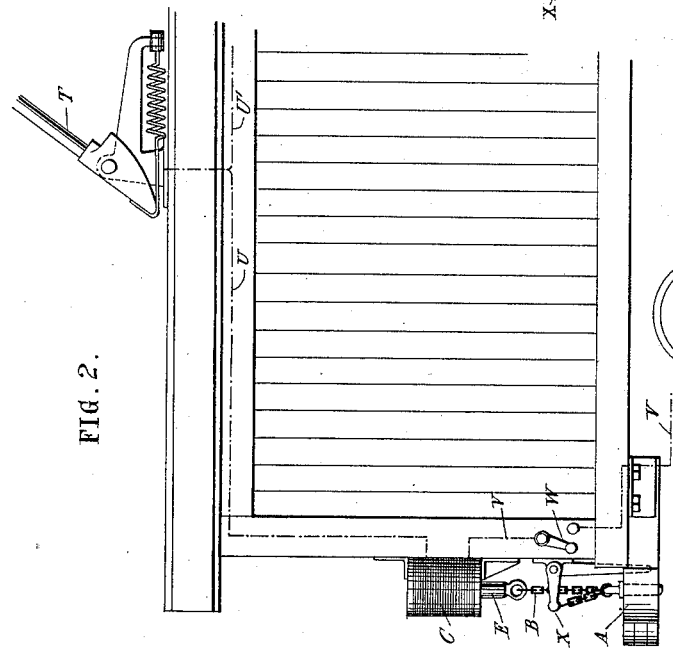

Referring to the accompanying drawings, in which similar letters represent corresponding parts throughout both views, Figure 1 shows an end view of a car provided with an electrical coupler-operating device included in a branch circuit from a circuit which uses the rails as a main-line circuit, and Fig. 2 shows a side view of a car having the electrical coupler-operating device included in a branch circuit from a circuit which uses one rail and an overhead conductor as a main-line circuit.

A is the car-coupling.

B is an attachment which, when operated, operates the coupling.

C represents the electric motor to operate the coupling.

The coupling A may be of any suitable form and construction, and I have shown one form of a Janney type of coupling as an example. The connection B between such coupling and the electric motor may also be of any suitable construction, and I have illustrated a chain or linked connection as one form. So, likewise, the electric motor may be of any suitable kind, and is illustrated as an electromagnet C, provided with a pivoted armature D, as shown in Fig. 1, or provided with a movable core E, as shown in Figs. 2 and 3, to which the chain B is connected.

Referring to Fig. 1, the rails J and K are electrically connected with the source of power, and act as the main-line conductors. The circuit for energizing the coupler-operating motor is established through the wheels L and M, the axle being properly insulated at N. From a brush O extends a conductor P P' P² P³, provided with the circuit-closers Q' Q² Q³, (either of which may be used, as convenient,) thence to the coil of the motor C, while from the coil of the motor C there extends a conductor R, which terminates at the brush S.

When desiring to operate the coupler A, the workman may move either one of the circuit-closers Q' Q² Q³, and this opens or closes, as desired, the main-line circuit through the coupler-motor C, the core E of which is drawn upward and lifts the lock by means of the chain B.

The arrangement illustrated in Fig. 2 differs slightly from that of Fig. 1 in taking the current from an overhead wire by a trolley T, the tracks serving as the return-conductor. From the trolley-base branch conductors U U extend to coupler-operating motors at opposite ends of the car, one only of such motors being shown in the figure. From the motor C a conductor V, including the circuit-closer W, extends to a branch, the circuit being completed as shown in Fig. 1.

The circuit-closers carried by the car may be placed outside or inside of the car, and may be of various forms and arranged as desired.

In addition to the electrical coupling-operating device the usual hand-levers X, attached to the platform or the end of the car and connected with the coupling, may be used, as shown in the drawings.

Having described my invention, what I claim, and desire to secure by Letters Patent, is—

1. In a device for operating car-couplings, the combination of a car-coupler, an electric motor, a connection between said coupler and said motor, a switch to control the supply of current to the motor, said motor and switch being located in a branch circuit from the main-line circuit, substantially as and for the purpose described.

2. In a device for operating car-couplings, the combination of a car-coupler, an electric motor, a connection between said motor and said coupler, and a circuit-closing device to control the supply of current to the motor, said motor and circuit-closer being included in an independent movable branch circuit from the main-line circuit, deriving its current from a stationary source of supply, substantially as described and for the purpose set forth.

3. In a device for operating car-couplings, the combination of a car-coupler, an electric motor, a connection between said motor and said coupler, and a circuit-closing device to control the supply of current to the motor, said motor and circuit-closer being included in an independent derived circuit, from a movable branch circuit from the main-line circuit, deriving its current from a stationary source of supply, substantially as described and for the purpose set forth.

In witness whereof I have hereunto signed my name this 16th day of December, 1895.

J. E. HINDON HYDE.

In presence of—
JAMES J. COSGROVE,
WM. H. BERRIGAN, Jr.